(12) United States Patent
Deguchi et al.

(10) Patent No.: US 7,664,392 B2
(45) Date of Patent: Feb. 16, 2010

(54) AUTOMATIC POWER RESTORING METHOD AND OPTICAL COMMUNICATION SYSTEM

(75) Inventors: Hiroyuki Deguchi, Kawasaki (JP); Shinichirou Harasawa, Kawasaki (JP); Hideki Maeda, Yokohama (JP); Akira Naka, Yokosuka (JP); Gentaro Funatsu, Yokohama (JP)

(73) Assignees: Fujitsu Limited, Kawasaki (JP); Nippon Telegraph and Telephone Corporation, Tokyo (JP)

( * ) Notice: Subject to any disclaimer, the term of this patent is extended or adjusted under 35 U.S.C. 154(b) by 35 days.

(21) Appl. No.: 12/081,780

(22) Filed: Apr. 21, 2008

(65) Prior Publication Data
US 2008/0317461 A1 Dec. 25, 2008

Related U.S. Application Data

(62) Division of application No. 10/793,665, filed on Mar. 5, 2004, now Pat. No. 7,437,069.

(30) Foreign Application Priority Data
Mar. 6, 2003 (JP) ............................... 2003-060361

(51) Int. Cl.
H04B 10/08 (2006.01)
(52) U.S. Cl. .............................. 398/15; 398/6; 398/157
(58) Field of Classification Search .................... 398/1, 398/6, 15, 157
See application file for complete search history.

(56) References Cited

U.S. PATENT DOCUMENTS 4,994,675 A 2/1991 Levin et al.
5,335,104 A 8/1994 Johnson ....................... 398/110

(Continued)

FOREIGN PATENT DOCUMENTS

EP 1 006 682 A3 12/2000

(Continued)

OTHER PUBLICATIONS

U.S. Office Action mailed Sep. 30, 2009 in related U.S. Appl. No. 12/081,781.

(Continued)

*Primary Examiner*—Leslie Pascal
(74) *Attorney, Agent, or Firm*—Staas & Halsey LLP

(57) ABSTRACT

The present invention provides an automatic power restoring method capable of reliably detecting continuity by the dissolution of a line fault, to restore the optical power, even in a structure including an optical amplification medium on an optical transmission path and an optical communication system using the method. To this end, in an optical communication system to which the automatic power restoring method of the invention is applied, a pilot signal having a low transmission rate, a wavelength of which is set based on loss wavelength characteristics obtained by combining loss wavelength characteristics of an optical fiber used for the optical transmission path and loss wavelength characteristics of the optical amplification medium on the optical transmission path, is transmitted and received between an optical transmitting station and an optical receiving station when a line fault occurs, and a detection of continuity is thus performed. According to the result of the continuity detection, the power state at the occurrence of line fault is automatically restored to the power state at a time of normal operation.

6 Claims, 6 Drawing Sheets

U.S. PATENT DOCUMENTS

| | | | |
|---|---|---|---|
| 5,432,874 | A | 7/1995 | Muraguchi |
| 5,798,855 | A | 8/1998 | Alexander et al. |
| 6,359,708 | B1 | 3/2002 | Goel et al. ............ 398/110 |
| 6,483,616 | B1 | 11/2002 | Maddocks et al. |
| 2002/0097482 | A1 | 7/2002 | Sasaoka et al. |
| 2002/0114060 | A1 | 8/2002 | Kobayashi et al. |
| 2004/0208519 | A1* | 10/2004 | Feldman et al. ............ 398/30 |

FOREIGN PATENT DOCUMENTS

| | | |
|---|---|---|
| EP | 1 227 606 A1 | 7/2002 |
| EP | 0 880 242 A3 | 9/2003 |
| GB | 2 348 063 A | 9/2000 |
| GB | 2 372 655 | 8/2002 |
| JP | 07-30494 | 1/1995 |
| JP | 07-30495 | 1/1995 |
| JP | 2001-223646 | 8/2001 |
| JP | 2001-249369 | 9/2001 |
| JP | 2001-251006 | 9/2001 |
| JP | 2002-057624 | 2/2002 |
| WO | WO 99/45662 | 9/1999 |
| WO | WO 02/058287 A1 | 7/2002 |

OTHER PUBLICATIONS

U.S. Appl. No. 10/793,665, filed Mar. 5, 2004, Hiroyuki Deguchi, et al., Fujitsu Limited and Nippon Telegraph and Telephone Corp.

[Unassigned] Divisional 2 1344.1136D2, Apr. 21, 2008, Hiroyuki Deguchi, et al., Fujitsu Limited and Nippon Telegraph and Telephone Corp.

UK Search Report dated, Jan. 14, 2005 for corresponding UK Application No. GB0405068.8.

* cited by examiner (A) LOSS WAVELENGTH CHARACTERISTICS OF OPTICAL TRANSMISSION PATH FIBER (B) LOSS WAVELENGTH CHARACTERISTICS OF EDF (C) LOSS WAVELENGTH CHARACTERISTICS OF OPTICAL TRANSMISSION PATH FIBER + EDF

AUTOMATIC POWER RESTORING METHOD AND OPTICAL COMMUNICATION SYSTEM

This application is a divisional of prior U.S. patent application Ser. No. 10/793,665, filed Mar. 5, 2004, now U.S. Pat. No. 7,437,069 which claimed priority to Japanese Patent Application No. 2003-060361, filed Mar. 6, 2003, the entire contents of which are incorporated herein by reference.

BACKGROUND OF THE INVENTION (1) Field of the Invention

The present invention relates to a technique for automatically restoring an optical output that has been interrupted or the like by an occurrence of a line fault in an optical communication. In particular, it relates to an automatic power restoring method for when an optical transmission path includes an optical amplification medium, and an optical communication system to which the method is applied.

(2) Related Art

For example, international standards such as those of the IEC (International Electrotechnical Commission) require the optical power of a high power communication laser light to be reduced to a safelight level (class 1: average power+10 dBm or less) within a prescribed time after a line fault occurs, and these standards are also applied to various optical communication systems such as existing unrepeatered transmission systems and the like.

The abovementioned unrepeatered transmission system is a system for transmitting a signal light sent out from a transmitting section to an optical transmission path, to a receiving section without using a repeater apparatus. Furthermore, unrepeatered transmission systems in which a long distance transmission is achieved by applying Raman amplification or optical amplification of remote pumping system have been practically used. A large number of optical transmission techniques applied with Raman amplification and the like have been proposed both with and without repeater apparatuses. As specific examples, there are well known a technique relating to a power control of pumping light and amplification light (refer to Japanese Unexamined Patent Publication No. 2001-251006 and Japanese Unexamined Patent Publication No. 2002-57624), a technique relating to a wavelength dependence control of gain by Raman amplification (refer to Japanese Unexamined Patent Publication No. 2001-223646 and Japanese Unexamined Patent Publication No. 2001-249369) and the like.

In a conventional unrepeatered transmission system as described above, in the case where a line fault occurs due to disconnection or the like of an optical cable used for an optical transmission path, an automatic power shutdown (APSD) method for automatically detecting the occurrence of the fault and stopping operations of the transmitting section and receiving section (in the case where the receiving section includes a pumping light source for performing Raman amplification or optical amplification of remote pumping system) is applied to prevent a high level laser light from being emitted to outside, to thereby ensure the safety. In such a system to which APSD is applied, for example, a supervisory control signal light (Optical Supervisory Channel: OSC) having a transmission rate of about 1 Mbps, which is set to the safelight level of class 1 transmitted from the transmitting section, is utilized to perform processing such as, an automatic line fault detection, an automatic continuity detection, and stopping/restarting of the transmitting section and receiving section.

However, in the conventional unrepeatered transmission system as described above in which Raman amplification and optical amplification of remote pumping system are applied, since the transmission distance is long, considerable losses occur on the optical transmission path. Therefore, when a line fault occurs, it becomes difficult to receive a supervisory control signal light (optical power at a safelight level with a transmission rate of approximately 1 Mbps) sent out from the transmitting section as described above. Consequently, there is a problem in that in order to enable the reliable detection of continuity by the dissolution of line fault, a burden on the circuit design of the receiving section becomes significantly larger.

As a specific example, the case of the unrepeatered transmission system applied with Raman amplification is considered. If it is assumed that, for transmission conditions in this case, for example, the transmission distance is 250 km, the loss after deterioration over time in the optical cable used for the optical transmission path is 0.190 dB/km, the insertion loss after the breakage of the optical cable is 3.2 dB, and the loss in equipment configuring the system and splice loss is 7 dB, the sum of the losses from the transmitting section to the receiving section is 0.190 dB/km×250 km+3.2 dB+7 dB=57.7 dB. Accordingly, if the power of the supervisory control signal light sent out from the transmitting section after the occurrence of line fault is +7 dBm, the transmission rate is 1.5 Mbps, and the wavelength is 1575±10 nm, the power of the supervisory control signal light that reaches the receiving section in a state where the supply of the pumping light for Raman amplification is stopped, drops to about −51 dBm.

Furthermore, in the case of the unrepeatered transmission system to which optical amplification of remote pumping system is applied, since the optical amplification medium (for example, erbium doped fiber or the like) disposed on the optical transmission path serves as an absorption (loss) medium at the time of non-pumping, the power of the supervisory control signal light that reaches the receiving section drops further. To be specific, if it is assumed that, for the transmission conditions, for example, the transmission distance is 400 km, the loss after deterioration over time in the optical cable (low loss type) used for the optical transmission path is 0.180 dB/km, the insertion loss after the breakage of the optical cable is 3.2 dB, the loss in equipment configuring the system and splice loss is 7 dB, and the absorption by the optical amplification medium is 15 dB, the sum of the losses from the transmitting section to the receiving section is 0.180 dB/km×400 km+3.2 dB+7 dB+15 dB=97.2 dB. Accordingly, when a supervisory control signal light in a condition same as that in the case of the above-described Raman amplification, is sent out from the transmitting section after the occurrence of line fault, the power of the supervisory control signal light that reaches the receiving section, drops to about −90.2 dBm.

In order to receive reliably a supervisory control signal light of weak power as described above by the receiving section, a considerably high-sensitive receiving circuit is required, which is extremely difficult to be realized, and even if it can be realized, the system costs become high.

As one of methods for reducing the average power of a supervisory control signal light sent out from the transmitting section when a line fault occurs, a pulse shaped signal with a narrow width can be considered to be used as a supervisory control signal light. However, such a pulse shaped signal light has the high peak power, so even if it satisfies the safelight level standards, it cannot be recommended from the point of view of protecting human body.

SUMMARY OF THE INVENTION

The present invention has been accomplished in view of the above-described points, with an object of providing an automatic power restoring method capable of reliably detecting continuity by the dissolution of a line fault, to restore the optical power, even in a structure including an optical amplification medium on an optical transmission path, and an optical communication system to which the method is applied.

In order to achieve the above-described object, one aspect of an automatic power restoring method according to the present invention, in which, in an optical communication system which includes an optical amplification medium on an optical transmission path connecting between an optical transmitting station and an optical receiving station, for transmitting a main signal light sent out from the optical transmitting station to the optical receiving station via the optical transmission path while amplifying the main signal light, a power state at an occurrence of line fault in which the power of a light output from the optical transmitting station or the optical receiving station to the optical transmission path is suppressed to a predetermined level or lower, is restored to a power state at the time of normal operation according to a detection of continuity by dissolution of line fault, comprises: setting a wavelength of a pilot signal light corresponding to a wavelength where a loss is the smallest for loss wavelength characteristics obtained by combining loss wavelength characteristics of an optical transmission medium used for a portion other than the optical amplification medium of the optical transmission path and loss wavelength characteristics of the optical amplification medium in a state at the occurrence of line fault, to send out the pilot signal light at the predetermined power level or lower from one of the optical transmitting station and the optical receiving station to the optical transmission path at least when the line fault occurs; and detecting continuity, by receiving at the other station the pilot signal light sent out to the optical transmission path at the other station, to restore the power state at the occurrence of line fault to the power state at the time of normal operation.

In such an automatic power restoring method, since the wavelength of the pilot signal light is set, based on the loss wavelength characteristics obtained by combining the respective loss wavelength characteristics of the optical transmission medium and the optical amplification medium used for the optical transmission path, so that the transmission loss becomes minimum when a line fault occurs, then even if an optical amplification medium in a state where the amplification operation is stopped at the occurrence of line fault, exists on the optical transmission path, it becomes possible that the pilot signal light whose power at the time when transmitted from the one station is suppressed to the predetermined level (for example, the safelight level or the like) or lower, is received at the other station. Therefore, by receiving the pilot signal light to detect the continuity (dissolution of line fault), the light whose output power has been suppressed can be automatically restored to the state at the time of normal operation.

Further, another aspect of an automatic power restoring method of the present invention, in which, in an optical communication system for supplying a pumping light for Raman amplification from an optical receiving station side to an optical transmission path connecting between an optical transmitting station and an optical receiving station, and for transmitting a main signal light sent out from the optical transmitting station to the optical receiving station via the optical transmission path while amplifying the main signal light, a power state at an occurrence of line fault in which the power of a light output from the optical transmitting station or the optical receiving station to the optical transmission path is suppressed to a predetermined level or lower, is restored to a power state at the time of normal operation according to a detection of continuity by dissolution of line fault, comprises: when a line fault occurs, controlling the pumping light for Raman amplification at the power of the predetermined level or lower, to switch to a pilot signal light to send out the pilot signal light from the optical receiving station to the optical transmission path; and detecting continuity by receiving at the optical transmitting station the pilot signal light sent out to the optical transmission path, to restore the power state at the occurrence of line fault to the power state at the time of normal operation.

In such an automatic power restoring method, the pumping light for Raman amplification supplied from the optical receiving station to the optical transmission path at the time of normal operation, is switched to the pilot signal light when a line fault occurs to be sent out to the optical transmission path, and the pilot signal light is received at the optical transmitting station to detect the continuity. Thus, it becomes possible to automatically restore a light whose output power has been suppressed at the occurrence of line fault, to the power state at the time of normal operation.

In the automatic power restoring method of the above described aspects, the constitution may be such that a transmission rate of the pilot signal light is set to be lower than a transmission rate of a signal light indicating supervisory control information, which is transmitted between the optical transmitting station and the optical receiving station at the time of normal operation. By using the pilot signal light whose transmission rate is set to be low in this manner, a bandwidth used becomes narrower, and an amount of noise that interrupts communications is reduced. Consequently, it becomes possible to perform highly sensitive receiving processing, by a circuit which is easy to be realized and inexpensive.

Moreover, it is preferable that one station to which the above pilot signal light transmitted from the other station is transmitted, determines the receiving of the pilot signal light based on the wavelength and transmission rate of the receiving light. As a result, since the pilot signal light is easily discriminated from a dark current or the like generated at the time of receiving, it becomes possible to determine accurately whether or not the pilot signal light has been received, to thereby detect the continuity reliably.

In addition, a further aspect of an automatic power restoring method of the present invention, in which, in an optical communication system which includes an optical amplification medium on an optical transmission path connecting between an optical transmitting station and an optical receiving station, for transmitting a main signal light sent out from the optical transmitting station to the optical receiving station via the optical transmission path while amplifying the main signal light, a power state at an occurrence of line fault in which the power of a light output from the optical transmitting station or the optical receiving station to the optical transmission path is suppressed to a predetermined level or lower, is restored to a power state at the time of normal operation according to a detection of continuity by dissolution of line fault, comprises: setting a pilot signal light in a wavelength band, which is shifted to a long wavelength side by approximately 100 nm from a wavelength band of the main signal light; when a line fault occurs, to send out the main signal light from the optical transmitting station to the optical transmission path, and also to send out the pilot signal light at the predetermined level or lower from one of the optical transmitting station and the optical receiving station to the optical transmission path; and detecting continuity by receiving at the other station the pilot signal light sent out to the optical transmission path, to restore the power state at the occurrence of line fault to the power state at the time of normal operation.

In such an automatic power restoring method, the pilot signal light is amplified by a Raman effect in the optical transmission path where the main signal light is a pumping light. Hence, a dynamic range of the pilot signal light can be extended.

Other objects, features and advantages of the present invention will become apparent from the following description of embodiments, in conjunction with the appended drawings.

DETAILED DESCRIPTION OF THE INVENTION

Hereunder is a description of embodiments of the present invention based on drawings. Throughout the drawings, the same references denote the same or corresponding parts.

Figure 1:
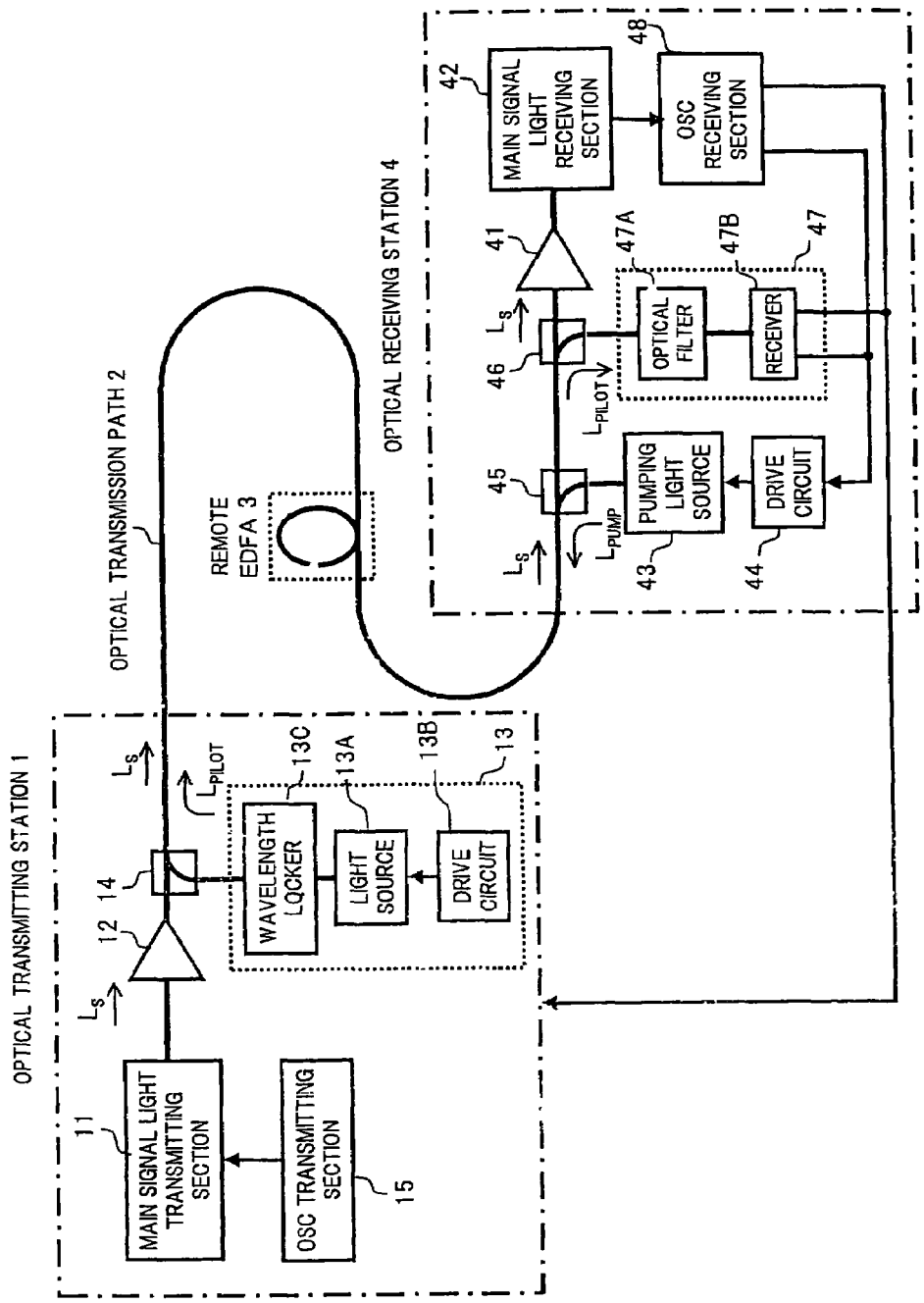
FIG. 1 is a block diagram showing an unrepeatered transmission system according to a first embodiment of the present invention.

FIG. 1 is a block diagram showing a first embodiment of an unrepeatered transmission system to which an automatic power restoring method of the present invention is applied.

In FIG. 1, the present unrepeatered transmission system comprises, for example, a system structure in which optical signals sent out from an optical transmitting station 1 are transmitted to an optical receiving station 4 via an optical transmission path 2 and a erbium doped optical fiber amplifier of a remote pumping system (referred to hereunder as a remote EDFA) 3 arranged on the optical transmission path 2.

The optical transmitting station 1 includes, for example, a main signal light transmitting section 11, a WDM optical amplifier 12, a pilot signal light transmitting section 13, a WDM coupler 14 and an OSC transmitting section 15.

The main signal light transmitting section 11 generates a WDM signal light (referred to hereunder as a main signal light $L_S$) obtained by multiplexing a plurality of optical signals with different wavelengths, to output it to the WDM optical amplifier 12. A wavelength band of the main signal light $L_S$ output from this main signal light transmitting section 11 is set according to loss wavelength characteristics of an optical fiber used for the optical transmission path 2 so that a transmission loss in the optical transmission path 2 becomes smaller, as described later. Here, the description is made on the case where the WDM signal light is adopted as the main signal light. However, it is also possible to use a signal light with a single wavelength as the main signal light, instead of the WDM signal light.

The WDM optical amplifier 12 amplifies the main signal light $L_S$ output from the main signal light transmitting section 11 to a previously set optical power level, and sends out the amplified main signal light $L_S$ to the optical transmission path 2 via the WDM coupler 14. Since the power of the main signal light $L_S$ sent out from this WDM optical amplifier 12 becomes an extremely high level at the time of normal operation, then in the case where a fault such as a line break or the like occurs, it is necessary to reduce the power to a safelight level in accordance with the international standards.

The pilot signal light transmitting section 13 comprises, for example, a light source 13A, a drive circuit 13B and a wavelength locker 13C. The light source 13A is a typical light source using a semiconductor laser or the like, which generates a pilot signal light $L_{PILOT}$ for detecting continuity when a line fault occurs. In this light source 13A, a power state of the pilot signal light $L_{PILOT}$ is controlled in accordance with a drive current supplied from the drive circuit 13B. A wavelength of the pilot signal light $L_{PILOT}$ generated in the light source 13A is set considering the loss wavelength characteristics of the optical fiber used for the optical transmission path 2 and loss wavelength characteristics of an erbium doped fiber (EDF) used as an optical amplification medium of the remote EDFA 3, as described later. Further, the pilot signal light $L_{PILOT}$ is a signal light with a low transmission rate of, for example, 10 kbps or the like, which is generated by supplying a low frequency modulated drive current to the light source 13A. The wavelength locker 13C is a well-known optical device stabilizing an output wavelength of the light source 13A so that the pilot signal light $L_{PILOT}$ becomes constant at a required wavelength even in the case where the wavelength of the light generated in the light source 13A is varied. The output wavelength of the light source 13A is not limited to be stabilized only by the wavelength locker, and for example, may be stabilized based on a temperature control of the light source 13A or the like.

The WDM coupler 14 multiplexes the main signal light $L_S$ from the WDM optical amplifier 12 and the pilot signal light $L_{PILOT}$ from the pilot signal light transmitting section 13, to send the multiplexed light to the optical transmission path 2.

The OSC transmitting section 15 transmits a typical supervisory control signal light (OSC) indicating a system operation status, to the optical receiving station 4 together with the main signal light $L_S$. To be specific, in the present system, for example, a well-known system in which information equivalent to a supervisory control signal light is transmitted to the optical receiving station 4 utilizing a required data area set in an overhead portion of the main signal light $L_S$, is applied to the abovementioned OSC transmitting section 15. Accordingly, the main signal light $L_S$ here includes a function as the supervisory control signal light.

The optical transmission path 2 optically connects between the optical transmitting station 1 and the optical receiving station 4, for which a typical optical fiber utilized for optical communication is used. This optical transmission path 2 basically has the loss wavelength characteristics as shown in (A) of FIG. 2 for example, although such loss wavelength characteristics are slightly varied depending on the type of optical fiber used. In the loss wavelength characteristics in (A) of FIG. 2, a loss becomes minimum in a wavelength band of 1575±10 nm. Therefore, the wavelength band of the aforementioned main signal light $L_S$ is set corresponding to the above-described wavelength band.

The remote EDFA 3 includes the erbium doped fiber (EDF) inserted on the optical transmission path 2, and amplifies the main signal light $L_S$ passing through the EDF to a required level as a result that a remote pumping light $L_{PUMP}$, which is sent out from the optical receiving station 4 to the optical transmission path 2, is propagated through the optical transmission path 2 in a direction opposite to that of the main signal light $L_S$ to be supplied to the EDF. The above-described EDF is an optical fiber with which erbium (Er), one of the rare earth elements, is doped. The EDF serves as the optical amplification medium for the main signal light $L_S$ when the remote pumping light $L_{PUMP}$ is supplied to it, while serving as an absorption (loss) medium for the main signal light $L_S$ when the remote pumping light $L_{PUMP}$ is not supplied to it. When the remote pumping light is not supplied, the EDF has the loss wavelength characteristics as shown in (B) of FIG. 2, for example. Here, the example is shown in which the optical amplifier of remote pumping system utilizing the EDF as the optical amplification medium is arranged on the optical transmission path 2. However, the present invention is not limited thereto, and it is also possible to arrange an optical amplifier of remote pumping system utilizing an optical fiber with which a rare earth element other than erbium is doped as the optical amplification medium, on the optical transmission path 2.

The optical receiving station 4 includes, for example, a WDM optical amplifier 41, a main signal light receiving section 42, a pumping light source 43, a drive circuit 44, WDM couplers 45 and 46, a pilot signal light receiving section 47, and an OSC receiving section 48.

The WDM optical amplifier 41 amplifies the main signal light $L_S$ that has been propagated through the optical transmission path 2 to be transmitted to the optical receiving station 4, to a level required for receiving processing, to output the amplified main signal light $L_S$ to the main signal light receiving section 42. The main signal light receiving section 42 executes the receiving processing of the main signal light $L_S$ amplified by the WDM optical amplifier 41. This receiving processing executed by the main signal light receiving section 42 is similar to the receiving processing of the main signal light executed in a conventional system. Furthermore, a part of the main signal light $L_S$ input to the main signal light receiving section 42 is given to the OSC receiving section 48, and receiving processing of the supervisory control information contained in the overhead portion of the main signal light $L_S$ is executed by the OSC receiving section 48. The OSC receiving section 48 judges the operation status of the system, the occurrence of line fault and the like, based on the supervisory control signal received, and at the time of normal operation, controls operations of the respective sections according the operation status indicated in the supervisory control signal. Furthermore, when a line fault occurs, the OSC receiving section 48 sends control signals for shutting down the supply of the remote pumping light $L_{PUMP}$ and the sending of the main signal light $L_S$ from the optical transmitting station 1 side (or for reducing them to the safelight level) to the drive circuit 44 and the WDM optical amplifier 12 on the side of the optical transmitting station 1, respectively, to thereby prevent a high level laser light from being emitted to outside.

The pumping light source 43 is a typical light source generating the remote pumping light $L_{PUMP}$ to be supplied to the remote EDFA 3 on the optical transmission path 2. In this pumping light source 43, an output state of the remote pumping light $L_{PUMP}$ is controlled in accordance with a drive current supplied from the drive circuit 44. Since the power of the remote pumping light $L_{PUMP}$ output from the pumping light source 43 also becomes an extremely high level at the time of normal operation, then in the case where a fault such as line breakage or the like occurs, it is necessary to reduce the power of the remote pumping light $L_{PUMP}$ to the safelight level in accordance with the international standards. The remote pumping light $L_{PUMP}$ output from the pumping light source 43 as described above is multiplexed by the WDM coupler 45 in the direction opposite to the propagation direction of the main signal light $L_S$, to be sent out to the optical transmission path 2.

The WDM coupler 46 demultiplexes a light in a wavelength band corresponding to the pilot signal light $L_{PILOT}$, out of the light sent from the optical transmission path 2 to the WDM optical amplifier 41. This light demultiplexed by the WDM coupler 46 is sent to the pilot signal light receiving section 47. The pilot signal light receiving section 47 includes, for example, an optical filter 47A and a receiver 47B, and the light from the WDM coupler 46 is given to the receiver 47B via the optical filter 47A. The optical filter 47A is a narrow bandpass filter, and the central wavelength of a transmission band thereof is set to match the wavelength of the pilot signal light $L_{PILOT}$. The receiver 47B receives the light transmitted through the optical filter 47A, confirms that the received signal light matches a predetermined transmission rate (here, 10 kbps as described previously, or the like), and determines whether or not the pilot signal light $L_{PILOT}$ is received. Upon receiving the pilot signal light $L_{PILOT}$, the receiver 47B detects continuity, and sends control signals, to the drive circuit 44 and the optical transmitting station 1, respectively, for restoring the supply of the remote pumping light $L_{PUMP}$ and the transmission of the main signal light $L_S$ to their states before the occurrence of line fault.

Here is a detailed description of the pilot signal light $L_{PILOT}$ that is transmitted and received between the pilot signal light transmitting section 13 of the optical transmitting station 1 and the pilot signal light receiving section 47 of the optical receiving station 4.

The pilot signal light $L_{PILOT}$ is a signal light transmitted and received between the optical transmitting station 1 and the optical receiving station 4 in order to detect the continuity at the occurrence of line fault, as described above. One characteristic of this pilot signal light $L_{PILOT}$ is that the wavelength thereof is set to enable the reduction of the transmission loss, compared with a supervisory control signal light used for a conventional automatic continuity detection, even if the pilot signal light $L_{PILOT}$ is transmitted through the optical transmission path 2 and the remote EDFA 3 to which the supply of the remote pumping light $L_{PUMP}$ has been stopped. Further, another characteristic thereof is that the above pilot signal light $L_{PILOT}$ is set as a continuity detection dedicated signal light different from the supervisory control signal light, so as to enable the reduction of the transmission rate of the signal light transmitted at the time of line fault, thus making it easier to design the circuit on the receiver side.

Figure 2:
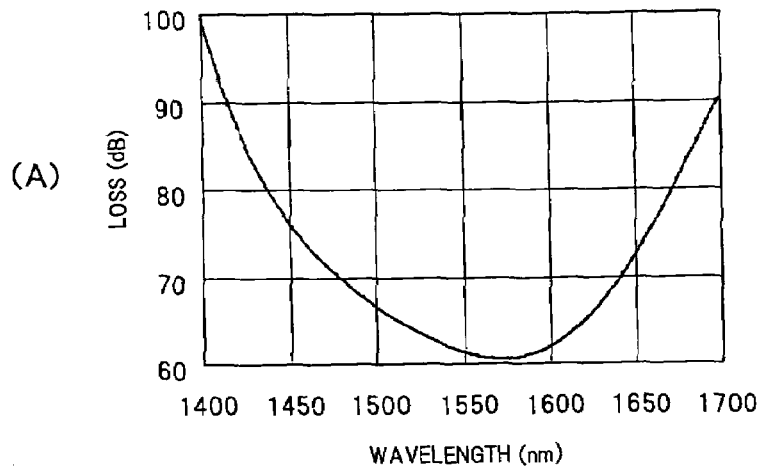
FIG. 2 shows graphs illustrating respective loss wavelength characteristics of an optical fiber used for an optical transmission path and a remote EDFA, which serve as optical amplification media, and loss wavelength characteristics obtained by combining the above loss wavelength characteristics in the first embodiment.
Figure 2:
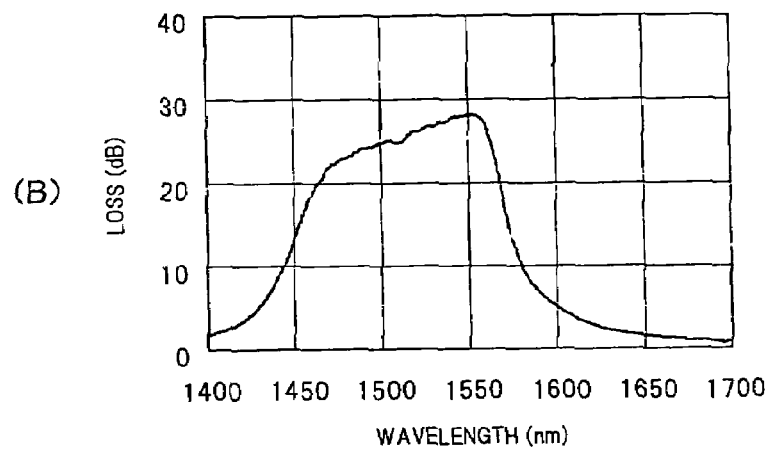
Figure 2:
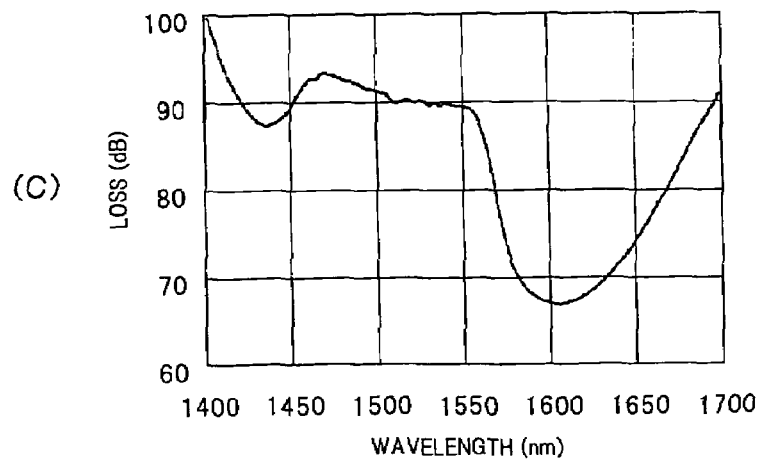

To be specific, the wavelength of the pilot signal light $L_{PILOT}$ is set in a wavelength band where a loss for when it is transmitted from the optical transmitting station 1 to the optical receiving station 4 at the time of line fault becomes minimum, based on the loss wavelength characteristics shown in (C) of FIG. 2 obtained by combining the loss wavelength characteristics of the optical fiber used for the optical transmission path 2 shown in (A) of FIG. 2 and the loss wavelength characteristics of the optical amplification medium (EDF) of the remote EDFA 3 shown in (B) of FIG. 2. That is, in the loss wavelength characteristics in (C) of FIG. 2, since the loss becomes the lowest around 1600±10 nm, the central wavelength of the pilot signal light $L_{PILOT}$ is set in the wavelength band of low loss containing the above wavelength band. To be more specific, it is desirable to set the central wavelength of the pilot signal light $L_{PILOT}$ in the wavelength band of 1600±30 nm.

In the case where a wavelength of the supervisory control signal light used for the conventional automatic continuity detection is arranged in a wavelength band different from that of the main signal light, it has been set in a wavelength band where the transmission loss becomes the lowest in the loss wavelength characteristics of the optical fiber used for the optical transmission path 2. To be specific, the wavelength of the supervisory control signal light has been set in a wavelength band around 1575±10 nm where the loss becomes the lowest based on the loss wavelength characteristics shown in (A) of FIG. 2. Further, according to IEEE regulations, when the wavelength of the main signal light $L_S$ is in the 1550 nm band, 1510 nm is recommended as the wavelength of a supervisory control signal light. As is clear from the loss wavelength characteristics shown in (C) of FIG. 2, a considerable transmission loss occurs in the supervisory control signal light set in such a wavelength band at the time of line fault.

Moreover, for the transmission rate of the pilot signal light $L_{PILOT}$, since the pilot signal light $L_{PILOT}$ is a continuity detection dedicated signal light, it does not need to be a signal light capable of transmitting a large amount of information differently from the conventional supervisory control signal light, and even if the pilot signal light $L_{PILOT}$ is a continuous light, the continuity detection is basically possible. However, in the case where the pilot signal light $L_{PILOT}$ is a continuous light, since there is a possibility that it becomes difficult to discriminate the pilot signal light $L_{PILOT}$ from a dark current or the like generated at the time of receiving, it is desirable that a low frequency modulation is performed on the drive current when being transmitted so that the continuous light is set as the pilot signal light $L_{PILOT}$ of a low transmission rate of 10 kbps or the like, for example, to make the above discrimination easier. For the pilot signal light $L_{PILOT}$ of such a low transmission rate, the bandwidth to be used can be set narrow, and as the bandwidth becomes narrower, the amount of noise that interrupts communication is reduced. Therefore, compared with the conventional supervisory control signal light of a transmission rate such as 1 Mbps, 1.5 Mbps or the like, it becomes possible to perform highly sensitive receiving processing by a circuit which is easy to be realized and inexpensive.

A specific improvement effect of the receiving sensitivity due to the reduction of the transmission rate as described above is shown as follows. For example, if the transmission rate is reduced to a half, such as from 100 kbps to 50 kpbs, or the like, the noise band is also reduced to a half. Therefore, the receiving processing becomes possible even if the receiving power drops to a half electrically, or to $2^{-1/2}$=0.707 times optically. If this is expressed in decibels, 10×log (0.707)=−1.5 dB, so if the transmission rate is reduced to a half (0.5 times), the receiving sensitivity is improved by 1.5 dB. If a receiving sensitivity improvement amount due to the reduction of the transmission rate is generalized, it can be expressed by a relationship shown in the following equation (1).

$$\text{Receiving sensitivity improvement amount (dB)}=10\times \log\{1+(1/\text{transmission rate change ratio})^{1/2}\} \quad (1)$$

By the relationship in the above equation (1), assuming that the transmission rate of the conventional supervisory control signal light is 1.5 Mbps for example, the receiving sensitivity improvement amount is calculated according to the transmission rate change ratio, and the result is summarized in the following Table 1.

TABLE 1

| Transmission Rate | Change Ratio | Improvement Amount |
|---|---|---|
| 1.5 Mbps → 100 kbps | 1/15 | 5.9 dB |
| 1.5 Mbps → 10 kbps | 1/150 | 10.9 dB |
| 1.5 Mbps → 1 kbps | 1/1500 | 15.9 dB |
| 1.5 Mbps → 100 bps | 1/15000 | 20.9 dB |
| 1.5 Mbps → 10 bps | 1/150000 | 25.9 dB |
| 1.5 Mbps → 1 bps | 1/1500000 | 30.9 dB |

Next is a description of an operation of the unrepeatered transmission system of the first embodiment.

In the unrepeatered transmission system of the above-described configuration, at the time of normal operation, in the optical transmitting station 1, the main signal light $L_S$, which is transmitted from the main signal light transmitting section 11 and whose optical level is amplified by the WDM optical amplifier 12, is sent out to the optical transmission path 2 via the WDM coupler 14. In this main signal light $L_S$, since the information equivalent to the supervisory control signal light is contained in the required data area in the overhead portion, the supervisory control information is transmitted at the same time by the main signal light $L_S$. The main signal light $L_S$ sent out to the optical transmission path 2 is propagated through the optical transmission path 2 to be transmitted to the optical receiving station 4, while being amplified by the remote EDFA 3, which is supplied with the remote pumping light $L_{PUMP}$ output from the pumping light source 43 of the optical receiving station 4.

In the optical receiving station 4, the main signal light $L_S$ from the optical transmission path 2 is input to the WDM optical amplifier 41 via the WDM couplers 45 and 46, and the main signal light $L_S$ amplified to the required level by the WDM optical amplifier 41 is given to the main signal light receiving section 42 for the receiving processing. Furthermore, a part of the main signal light $L_S$ given to the main signal light receiving section 42 is sent to the OSC receiving section 48, and the receiving processing of the supervisory control information contained in the overhead portion of the main signal light $L_S$, and the required supervisory control based on the supervisory control information, are performed in the OSC receiving section 48.

At the time of normal operation, the operation of the pilot signal light transmitting section 13 of the optical transmitting station 1 is stopped, and the pilot signal light $L_{PILOT}$ is not transmitted from the optical transmitting station 1 to the optical receiving station 4.

When a line fault occurs due to the breakage of the optical cable or the like, an automatic detection of the occurrence of line fault is performed by the OSC receiving section 48 in the optical receiving station 4 utilizing the supervisory control signal light (here, the supervisory control information contained in the overhead portion of the main signal light $L_S$), similarly to the conventional automatic power shutdown method. In accordance with the control signal output from the OSC receiving section 48, the respective operations of the WDM optical amplifier 12 in the optical transmitting station 1 and the drive circuit 44 in the optical receiving station 4 are controlled, so that the sending out of the main signal light $L_S$ from the optical transmitting station 1 side and the supply of the remote pumping light $L_{PUMP}$ from the optical receiving station 4 side are respectively shut down, or the respective powers of the main signal light $L_S$ and the remote pumping light $L_{PUMP}$ are reduced to the safelight level. As a result, a high level laser light is prevented from being emitted to outside at the occurrence of line fault.

When a safe state is ensured by the automatic output power shutdown (or reduction) operation at the occurrence of line fault as described above, next, the pilot signal light $L_{PILOT}$ for detecting the continuity due to the dissolution of line fault is sent out from the pilot signal light transmitting section 13 in the optical transmitting station 1 to the optical transmission path 2 via the WDM coupler 14. Since the power of this pilot signal light $L_{PILOT}$ when being transmitted is suppressed to the safelight level, then even if the pilot signal light $L_{PILOT}$ is emitted to outside from the broken optical cable, it does not pose a danger to the human body. Furthermore, the wavelength of the pilot signal light $L_{PILOT}$ is set in the wavelength band where the transmission loss becomes the lowest in the state where the supply of the remote pumping light $L_{PUMP}$ is substantially stopped, considering the loss wavelength characteristics of both the optical transmission path 2 and the remote EDFA 3. Therefore, even if the power the pilot signal light $L_{PILOT}$ when being transmitted is weak, the power thereof that reaches the optical receiving station 4 when the line fault is dissolved, is ensured to be at a level capable of being received by the pilot signal light receiving section 47. Assuming the case where the wavelength of the pilot signal light $L_{PILOT}$ is set to the wavelength same as that of the supervisory control signal light used for the conventional continuity detection, that is, the wavelength where the transmission loss of the optical cable used for the optical transmission path 2 becomes the lowest, since the pilot signal light $L_{PILOT}$ is subjected to a large loss in the remote EDFA 3, then even if the line fault has dissolved, it is difficult for the optical receiving station 4 to receive the pilot signal light $L_{PILOT}$.

To be specific, the operation of from when the continuity is detected after the occurrence of line fault until the supply of the remote pumping light $L_{PUMP}$ and the sending out of the main signal light $L_S$ are restarted will be described in detail with reference to FIG. 3. Here, a specific example is considered in which, assuming a configuration where two systems shown in FIG. 1 are combined with each other to correspond to an uplink and a downlink, respectively, a restoring operation for when the line fault (black circle in FIG. 3) occurs on the optical transmission path 2 on the uplink side is performed utilizing the downlink. It is also assumed that the supply of the remote pumping light $L_{PUMP}$ on the downlink side and the sending out of the main signal light $L_S$ are shut down or such like, due to the occurrence of line fault on the uplink side.

Figure 3:
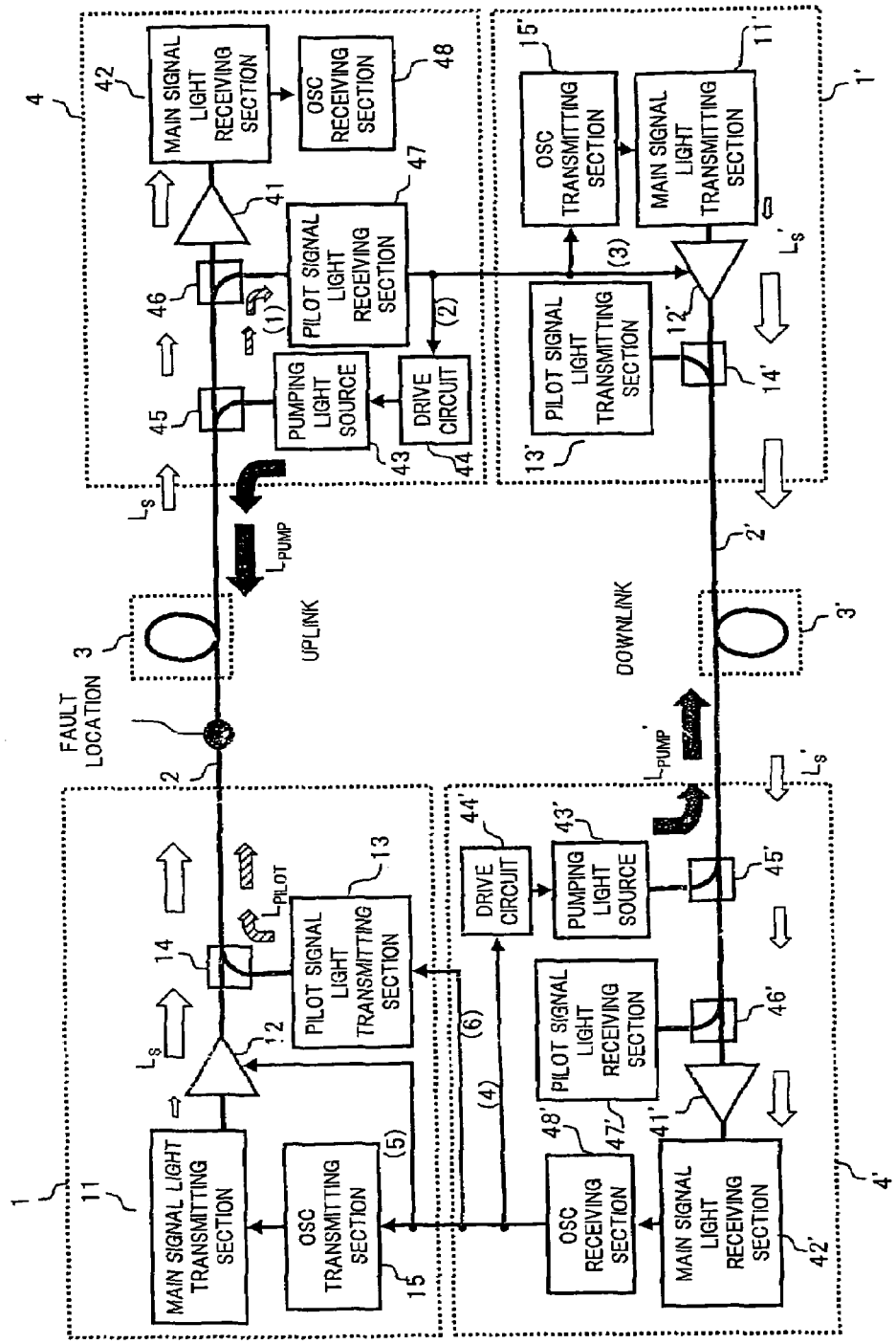
FIG. 3 is a diagram for explaining an operation after a line fault occurs in the first embodiment.

When the line fault occurred on the optical transmission path 2 is dissolved, the pilot signal light $L_{PILOT}$ sent out from the optical transmitting station 1 on the uplink side is propagated through the optical transmission path 2 and the remote EDFA 3 to reach the optical receiving station 4, and passes through the WDM couplers 45 and 46 to be sent to the pilot signal light receiving section 47 (arrows corresponding to (1) in FIG. 3). In the pilot signal light receiving section 47, based on the wavelength and the transmission rate of the light from the WDM coupler 46, the receiving of the pilot signal light $L_{PILOT}$ is determined, and the continuity is thus detected.

The pilot signal light receiving section 47, in which the continuity is detected, outputs a control signal to the drive circuit 44 in its own station (arrow corresponding to (2) in FIG. 3), and restores the drive state of the pumping light source 43 to the state at a normal time to restart the supply of the remote pumping light $L_{PUMP}$ of the required power. Furthermore, simultaneously with this, the pilot signal light receiving section 47 also sends a control signal to an optical transmitting station 1' on the downlink side (arrow corresponding to (3) in FIG. 3), and restores the operation state of a WDM optical amplifier 12' to the state at the normal time, so that a descending main signal light $L_S'$ loaded in its overhead portion with the supervisory control information indicating that the line fault that occurred on the uplink side has been dissolved, is sent out from a main signal light transmitting section 11' to an optical transmission path 2' via the WDM optical amplifier 12' and a WDM coupler 14'.

When the main signal light $L_S'$ sent out to the optical transmission path 2' on the downlink side is received by an optical receiving station 4', and the supervisory control information in the overhead portion is identified by an OSC receiving section 48', the OSC receiving section 48' outputs a control signal to a drive circuit 44' in its own station (arrow corresponding to (4) in FIG. 3), and restores the drive state of a pumping light source 43' to the state at the normal time to restart the supply of a remote pumping light $L_{PUMP}'$ of the required power. Further, simultaneously with this, the OSC receiving section 48' also sends a control signal to the optical transmitting station 1 on the uplink side (arrow corresponding to (5) in FIG. 3), and restores the operation states of the main signal light transmitting section 11 and the WDM optical amplifier 12 to the state at the normal time, so that the ascending main signal light $L_S$ is sent out to the optical transmission path 2 at the required high power via the WDM optical amplifier 12 and the WDM coupler 14. Furthermore, at this time, the operation of the pilot signal light transmitting section 13 is stopped, and the transmission of the pilot signal light $L_{PILOT}$ to the uplink is terminated (arrow corresponding to (6) in FIG. 3).

By the series of operations as described above, the detection of the continuity at the occurrence of line fault is performed utilizing the pilot signal light $L_{PILOT}$, and the supply of remote pumping lights $L_{PUMP}$ and $L_{PUMP}'$, and the sending out of main signal lights $L_S$ and $L_S'$ on the uplink and down link, are restored automatically.

In this manner, according the unrepeatered transmission system of the first embodiment, the continuity is detected using the pilot signal light $L_{PILOT}$ whose wavelength is set based on the loss wavelength characteristics obtained by combining the respective loss wavelength characteristics of the optical transmission path 2 and the remote EDFA 3. Thus, it becomes possible to receive the pilot signal light $L_{PILOT}$ whose power at the time of transmitting is suppressed to the safelight level, by the optical receiving station 4, even if the remote EDFA 3 to which the supply of remote pumping light $L_{PUMP}$ is stopped, exists on the optical transmission path 2. Further, since the pilot signal light $L_{PILOT}$ is a signal light of a low transmission rate, it is possible to easily discriminate the pilot signal light $L_{PILOT}$ from the dark current or the like generated at the time of receiving. A circuit for performing the receiving processing of such a pilot signal light $L_{PILOT}$ can be realized more easily than a circuit for performing the receiving processing of the conventional supervisory control signal light. Therefore, it is possible to reduce the burden on the designing of a receiving circuit.

Moreover, in the above first embodiment, the supervisory control information is loaded in the overhead portion of the main signal light $L_S$. However, the transmission system of the supervisory control information of the present invention is not limited thereto. For example, a supervisory control signal light whose wavelength is different from that of the main signal light $L_S$ may be separately provided. In this case, the constitution may be such that the supervisory control signal light is transmitted between the optical transmitting station 1 and the optical receiving station 4 at the time of normal operation, and when the occurrence of line fault is detected, the pilot signal light $L_{PILOT}$ is transmitted instead of the supervisory control signal light. Furthermore, it is also possible to use the pilot signal light $L_{PILOT}$ that is transmitted at the occurrence of line fault as the supervisory control signal light after the fault dissolution, for example. That is, the constitution may be such that, when the continuity is detected utilizing the pilot signal light $L_{PILOT}$ at the safelight level and of a low transmission rate, the transmission rate of the pilot signal light $L_{PILOT}$ is increased, to load the supervisory control information in the pilot signal light $L_{PILOT}$, and also to increase the output power of the pilot signal light $L_{PILOT}$, so that the pilot signal light $L_{PILOT}$ is switched to the supervisory control signal light to be transmitted at the time of normal operation after restoration.

Furthermore, in the first embodiment, the example has been shown, in which the pilot signal light $L_{PILOT}$ is sent out at the occurrence of line fault, and the sending out of the pilot signal light $L_{PILOT}$ is stopped when the line is restored to the normal state. However, it is also possible that the pilot signal light $L_{PILOT}$ continues to be sent out even at the time of normal operation.

In addition, the configuration example has been shown, in which the remote pumping light $L_{PUMP}$ for the remote EDFA 3 is supplied from the optical receiving station 4 side. However, the remote pumping light $L_{PUMP}$ may be supplied from the optical transmitting station 1 side.

Furthermore, as an application example of setting the wavelength of the pilot signal light $L_{PILOT}$ in the first embodiment as described above, it is also effective to set the pilot signal light $L_{PILOT}$ in a wavelength band shifted from the wavelength band of the main signal light $L_S$ to a longer wavelength side by approximately 100 nm, and to amplify the pilot signal light $L_{PILOT}$ due to the Raman effect in the optical transmission path 2 in which the main signal light $L_S$ is utilized as the pumping light. However, in this case, the main signal light $L_S$ of a certain power level continues to be transmitted to the optical transmission path 2 even after the occurrence of line fault. Such amplification of the pilot signal light $L_{PILOT}$ utilizes a characteristic in which a peak of Raman gain occurs at a frequency lower by 13.2 THz than the frequency of the pumping light. A maximum Raman is obtained on the longer wavelength side by approximately 100 nm in the typical main signal light $L_S$ in 1550 nm band. Therefore, by utilizing the main signal light $L_S$ as the pumping light to perform Raman amplification of the pilot signal light $L_{PILOT}$, the dynamic range of the pilot signal light $L_{PILOT}$ can be extended. In addition, the above-described Raman gain is not concentrated only on a peak wavelength, but an amplification effect occurs over a wide range before and after the peak wavelength (to approximately 110 nm). Therefore, it becomes possible to Raman amplify the pilot signal light $L_{PILOT}$ due to a pumping effect mainly on the side of the shorter wavelength of the main signal light $L_S$, even in the case of wavelength setting in the above-mentioned first embodiment, that is, even in the case where the wavelength of the pilot signal light $L_{PILOT}$ is set to 1600±30 nm relative to the main signal light $L_S$ in 1550 nm band. Accordingly, the transmission of the main signal light $L_S$ even after the occurrence of line fault is effective for the extension of the dynamic range of the pilot signal light $L_{PILOT}$.

Next is a description of an unrepeatered transmission system in a second embodiment, to which the automatic power shutdown and restoring method of the present invention is applied.

Figure 4:
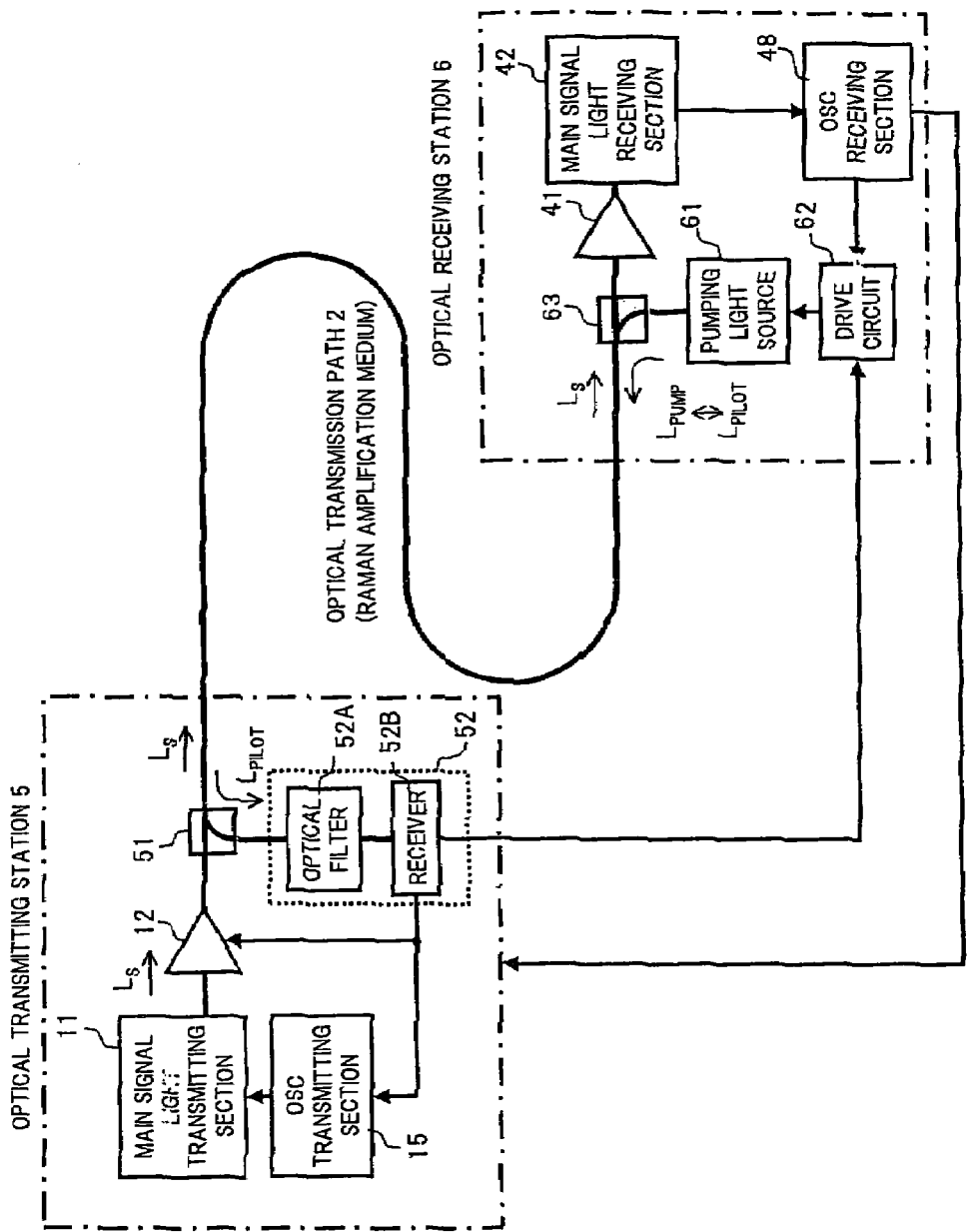
FIG. 4 is a block diagram showing an unrepeatered transmission system according to a second embodiment of the present invention.

FIG. 4 is a block diagram showing the unrepeatered transmission system of the second embodiment.

In FIG. 4, the second embodiment is constituted such that, in an unrepeatered transmission system in which a long distance transmission is achieved by applying Raman amplification, a pumping light for Raman amplification that is supplied from the receiving side to the optical transmission path 2 at the time of normal operation, after the occurrence of line fault, is transmitted from the receiving side to the transmitting side as the continuity detection dedicated signal light, which corresponds to the pilot signal light $L_{PILOT}$ in the first embodiment.

To be specific, the unrepeatered transmission system of the present embodiment, is constituted such that, in a system structure where the main signal light $L_S$ sent out from an optical transmitting station 5 is transmitted to an optical receiving station 6 via an optical transmission path 2 while being Raman amplified, the optical receiving station 6 is provided with a pumping light source 61, a drive circuit 62 and a WDM coupler 63, which supply the pumping light $L_{PUMP}$ for Raman amplification to the optical transmission path 2 at the time of normal operation, while at the occurrence of line fault, transmitting the abovementioned pumping light $L_{PUMP}$ for Raman amplification to the optical transmitting station 5 as the pilot signal light $L_{PILOT}$. Further, the optical transmitting station 5 is provided with a WDM coupler 51 and a pilot signal light receiving section 52, which receive the pilot signal light $L_{PILOT}$ transmitted from the optical receiving station 6 via the optical transmission path 2 at the occurrence of line fault to detect the continuity, and restart the sending out of the main signal light $L_S$ and the supply of the Raman pumping light $L_{PUMP}$.

The main signal light transmitting section 11, the WDM optical amplifier 12 and the OSC transmitting section 15 provided in the optical transmitting station 5; the WDM optical amplifier 41, the main signal light receiving section 42 and the OSC receiving section 48 provided in the optical receiving station 6; and the optical transmission path 2 connecting between the optical transmitting station 5 and the optical receiving station 6 are respectively similar to the corresponding components of the above described first embodiment, and the descriptions thereof are omitted here.

The pumping light source 61 provided in the optical receiving station 6 is a typical pumping light source for Raman amplification, that can generate the pumping light $L_{PUMP}$ having required wavelength and power capable of Raman amplifying the main signal light $L_S$ being propagated through the optical transmission path 2. An output state of this pumping light source 61 is controlled in accordance with a drive current supplied from the drive circuit 62, and the switching is performed between the supply of high level Raman pumping light $L_{PUMP}$ at the time of normal operation, and the sending out of the pilot signal light $L_{PILOT}$ at the safelight level at the occurrence of line fault. Further, the pilot signal light $L_{PILOT}$ sent out at the occurrence of line fault is a signal light of a low transmission rate of 10 kbps or the like, for example, which is generated by supplying a low frequency modulated drive current to the pumping light source 61. The switching of the output state of the above pumping light source 61 is performed according to control signals transmitted from the OSC receiving section 48 and the pilot signal light receiving section 52 on the optical transmitting station 5 side to the drive circuit 62 as described later. The Raman pumping light $L_{PUMP}$ or the pilot signal light $L_{PILOT}$, output from the pumping light source 61, are multiplexed by the WDM coupler 63 in a direction opposite to the propagation direction of the main signal light $L_S$, to be sent out to the optical transmission path 2.

The WDM coupler 51 disposed in the optical transmitting station 5 demultiplexes a light in a wavelength band corresponding to the pilot signal light $L_{PILOT}$, from the light that has been propagated through the optical transmission path 2 in the direction opposite to the propagation direction of the main signal light $L_S$ to reach the optical transmitting station 5. The light demultiplexed by this WDM coupler 51 is sent to the pilot signal light receiving section 52. The pilot signal light receiving section 52 includes, for example, an optical filter 52A and a receiving 52B, and the light from the WDM coupler 51 is given to the receiver 52B via the optical filter 52A. The optical filter 52A is a narrow bandpass filter, and the central wavelength of a transmission band thereof is set to match the wavelength of the pilot signal light $L_{PILOT}$, that is, the wavelength of the Raman pumping light $L_{PUMP}$. The receiver 52B receives the light transmitted through the optical filter 52a, confirms that the received signal light has a predetermined transmission rate (here, 10 kbps as described previously, or the like), and determines whether or not the pilot signal light $L_{PILOT}$ is received. Upon receiving the pilot signal light $L_{PILOT}$, the receiver 52B detects the continuity and sends control signals to the WDM optical amplifier 12, the OSC transmitting section 15, and the drive circuit 62 in the optical receiving station 6, respectively, for restarting the transmission of the main signal light $L_S$ and the supply of the Raman pumping light $L_{PUMP}$.

Next is a description of an operation of the unrepeatered transmission system of the second embodiment.

In the unrepeatered transmission system of the configuration as described above, at the time of normal operation, similarly to the first embodiment described above, the high level main signal light $L_S$ containing the supervisory control information in its overhead portion is sent out from the optical transmitting station 5 to the optical transmission path 2, and the main signal light $L_S$ is transmitted to the optical receiving station 6 while being Raman amplified by the optical transmission path 2 to which the pumping light $L_{PUMP}$ output from the optical receiving station 6 is supplied. In the optical receiving station 6, the main signal light $L_S$ from the optical transmission path 2 is given to the main signal light receiving section 42 via the WDM coupler 63 and the WDM optical amplifier 41 for the receiving processing, and at the same time, a part of the main signal light $L_S$ is also sent to the OSC receiving section 48, so that the receiving processing of the supervisory control information contained in the overhead portion of the main signal light $L_S$, and a required supervisory control based on the supervisory control information, are performed.

When a line fault occurs, then similarly to the conventional automatic power shutdown system, the automatic detection of the occurrence of line fault utilizing the supervisory control signal light (here, the supervisory control information contained in the overhead portion of the main signal light $L_S$) is performed by the OSC receiving section 48 in the optical receiving station 6. The OSC receiving section 48 which detected the occurrence of line fault, reduces the output power of the pumping light source 61 to the safelight level, and also outputs a control signal to the drive circuit 62 so that the low frequency modulated drive current is given to the pumping light source 61, to thereby switch the pumping light $L_{PUMP}$ for Raman amplification supplied to the optical transmission path 2 to the pilot signal light $L_{PILOT}$ for the continuity detection. Furthermore, the OSC receiving section 48 outputs a control signal to the optical transmitting station 5, for shutting down the sending out of the main signal light $L_S$ from the optical transmitting station 5 side, or for reducing the main signal light $L_S$ to the safelight level. As a result, a high level laser light is prevented from being emitted to outside at the occurrence of line fault, and at the same time, the continuity detection is started utilizing the pilot signal light $L_{PILOT}$ sent out from the optical receiving station 6 toward the optical transmitting station 5.

To be specific, the operation of from when the continuity is detected after the occurrence of line fault until the sending out of the main signal light $L_S$ and the supply of the Raman pumping light $L_{PUMP}$ are restarted, will be described in detail with reference to FIG. 5. Here, also similarly to the above described case shown in FIG. 3, a specific example is considered in which, assuming a configuration where two systems shown in FIG. 4 are combined with each other to correspond to the uplink and the downlink, the restoring operation for when a line fault (black circle in FIG. 5) occurs on the optical transmission path 2 on the uplink side is performed utilizing the downlink.

Figure 5:
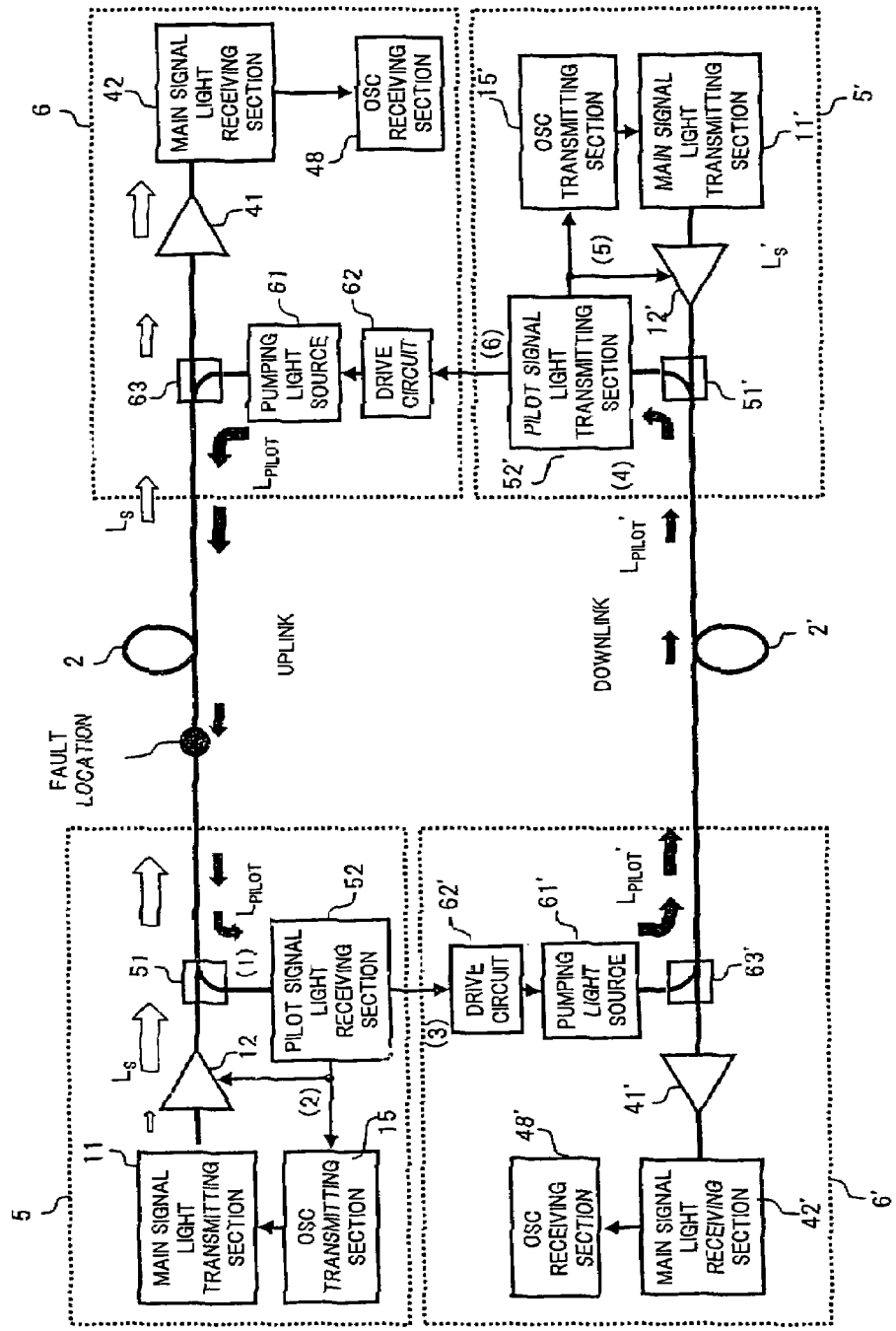
FIG. 5 is a diagram for explaining an operation after a line fault occurs in the second embodiment.

When the line fault occurred on the optical transmission path 2 is dissolved, the pilot signal light $L_{PILOT}$ sent out from the optical receiving station 6 on the uplink side is propagated through the optical transmission path 2, to reach the optical transmitting station 5, and passes through the WDM coupler 51 to be sent to the pilot signal light receiving section 52 (arrow corresponding to (1) in FIG. 5). In the pilot signal light receiving section 52, based on the wavelength and transmission rate of the light from the WDM coupler 51, the receiving of the pilot signal light $L_{PILOT}$ is determined, and the continuity is thus detected.

The pilot signal light receiving section 52, in which the continuity is detected, outputs control signals to the WDM optical amplifier 12 and the OSC transmitting section 15 in its own station (arrows corresponding to (2) in FIG. 5), so that the main signal light $L_S$ at the time of normal operation is sent out from the main signal light transmitting section 11 to the optical transmission path 2 via the WDM optical amplifier 12 and the OSC transmitting section 15. Further, simultaneously with this, the pilot signal light receiving section 52 also sends a control signal to a drive circuit 62' in an optical receiving station 6' on the downlink side (arrow corresponding to (3) in FIG. 5), and after sending a pilot signal light $L_{PILOT}'$, which contains information indicating that the line fault occurred on the uplink side has been dissolved, to the optical transmitting station 5' via the downlink, shifts the power of the pilot signal light $L_{PILOT}'$ to a high level at the time of normal operation, to restart the supply of Raman pumping light $L_{PUMP}'$ to the optical transmission path 2' on the downlink side.

When the pilot signal light $L_{PILOT}'$, which contains the information indicating that the line fault has been dissolved, transmitted to the optical transmission path 2' on the downlink side is received by the pilot signal light receiving section 52' in the optical transmitting station 5' to identify the recovery of the uplink (arrow corresponding to (4) in FIG. 5), the pilot signal light receiving section 52' outputs control signals to the WDM optical amplifier 12' and the OSC transmitting section 15' in its own station (arrows corresponding to (5) in FIG. 5), so that the main signal light $L_S'$ at the time of normal operation is sent from the main signal light transmitting section 11' to the optical transmission path 2' via the WDM optical amplifier 12' and the OSC transmitting section 15'. Further, simultaneously with this, the pilot signal light receiving section 52' also sends a control signal to the drive circuit 62 in the optical receiving station 6 on the uplink side (arrow corresponding to (6) in FIG. 5), and shifts the output power of the pumping light source 61 to the high level at the time of normal operation to thereby restart the supply of Raman pumping light $L_{PUMP}$ to the optical transmission path 2 on the uplink side.

By the series of operations as described above, the continuity at the occurrence of line fault is detected utilizing the pilot signal light $L_{PILOT}$, which is transmitted from the optical receiving station 6 to the optical transmitting station 5 by the switching of the output state of the pumping light source 61 for Raman amplification, and the sending out of the main signal lights $L_S$ and $L_S'$ and the supply of the Raman pumping lights $L_{PUMP}$ and $L_{PUMP}'$ on the up and down links are restored automatically.

In this manner, according to the unrepeatered transmission system of the second embodiment, if the Raman pumping light $L_{PUMP}$ is used as the pilot signal light $L_{PILOT}$ at the occurrence of line fault, the pilot signal light $L_{PILOT}$ whose power at the time of being transmitted from the optical receiving station 6 side is suppressed to the safelight level, can be received by the optical transmitting station 5 side. Therefore, it is possible to obtain a similar operational effect to that in the above first embodiment.

In the above-described second embodiment, the supervisory control information is also loaded in the overhead portion of the main signal light $L_S$. However, for example, a supervisory control signal light whose wavelength is different from that of the main signal light $L_S$ may be provided separately.

Next is a description of a third embodiment of an unrepeatered transmission system to which the automatic power shutdown and restoring method of the present invention is applied.

Figure 6:
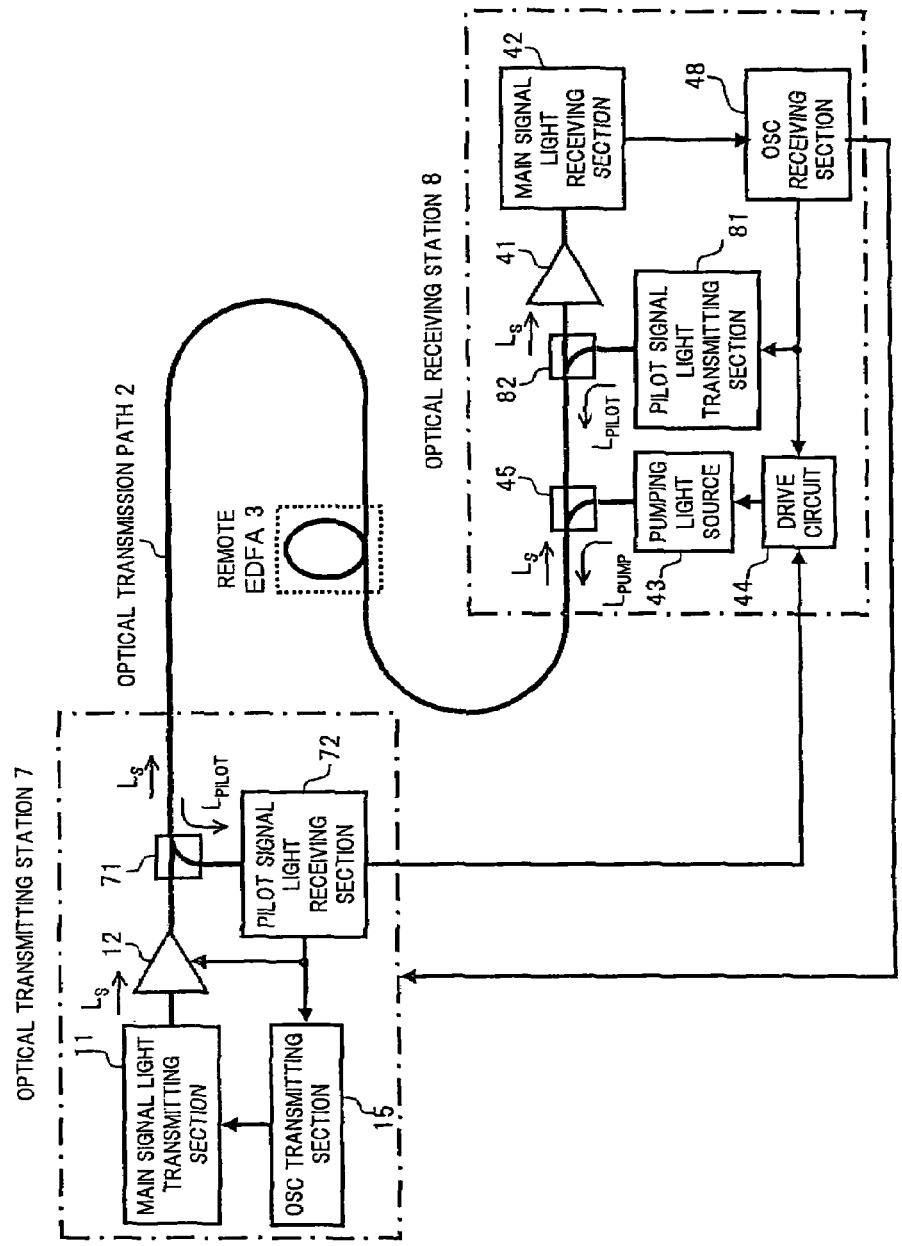
FIG. 6 is a block diagram showing an unrepeatered transmission system according to a third embodiment of the present invention.

FIG. 6 is a block diagram showing the unrepeatered transmission system of the third embodiment.

The configuration of the third embodiment shown in FIG. 6 is a modified example of the configuration of the above described first embodiment shown in FIG. 1, wherein the pilot signal light $L_{PILOT}$ for performing the continuity detection is sent out from an optical receiving station 8 side to be received by an optical transmitting station 7 side.

To be specific, the unrepeatered transmission system of the present embodiment is constituted such that, in a system structure in which the main signal light $L_S$ sent out from the optical transmitting station 7 is transmitted to the optical receiving station 8 via the optical transmission path 2 and the remote EDFA 3, the optical receiving station 8 is provided with a pilot signal light transmitting section 81 and a WDM coupler 82, which transmit the pilot signal light $L_{PILOT}$ toward the optical transmitting station 7 at the occurrence of line fault. Further, the optical transmitting station 7 is provided with a WDM coupler 71 and a pilot signal light receiving section 72, which receive the pilot signal light $L_{PILOT}$ transmitted from the optical receiving station 8 via the optical transmission path 2 and the remote EDFA 3 at the occurrence of line fault to detect the continuity, and restart the sending out of the main signal light $L_S$ and the supply of Raman pumping light $L_{PUMP}$. The configurations of the components other than those described above are similar to those of the first embodiment, and the descriptions thereof are omitted here.

The pilot signal light transmitting section 81 and the WDM coupler 82 disposed in the optical receiving station 8, are the same as the pilot signal light transmitting section 13 and the WDM coupler 14 disposed in the optical transmitting station 1 in the first embodiment. The pilot signal light $L_{PILOT}$ which is sent out from the pilot signal light transmitting section 81 to the optical transmission path 2 via the WDM coupler 82 at the occurrence of line fault, is a signal light of a low transmission rate, whose wavelength is set based on the loss wavelength characteristics obtained by combining the respective loss wavelength characteristics of the optical transmission path 2 and the remote EDFA 3.

The WDM coupler 71 and the pilot signal light receiving section 72 disposed in the optical transmitting station 7 are the same as the WDM coupler 46 and the pilot signal light receiving section 47 disposed in the optical receiving station 4 in the first embodiment. A light reached the optical transmitting station 7 from the optical receiving station 8 via the optical transmission path 2 and the remote EDFA 3, is demultiplexed by the WDM coupler 71 to be sent to the pilot signal light receiving section 72, where the receiving of the pilot signal light $L_{PILOT}$ is determined based on the wavelength and the transmission rate of the light, and the continuity is thus detected.

In the unrepeatered transmission system of the above configuration, the automatic power shutdown operation at the occurrence of line fault at the time of normal operation, are similar to those of the first embodiment. Further, an operation in which the continuity is detected after the occurrence of line fault, and the sending out of the main signal light $L_S$ and the supply of the remote pumping light $L_{PUMP}$ are restarted, can be considered to be the same as that in the second embodiment, except for that the control of the output state of the pilot signal light $L_{PILOT}$ from the pilot signal light transmitting section 81 in the optical receiving station 8 is performed instead of the switching control between the Raman pumping light and the pilot signal light as in above described the second embodiment. Accordingly, in the configuration as in the third embodiment, it is also possible to obtain a similar effect to that in the above first embodiment.

In the first to the third embodiments, the cases have been described in which the automatic power restoring method according to the present invention is applied to the unrepeatered transmission system in which the long distance transmission is achieved by applying optical amplification by the remote EDFA or Raman amplification. However, it is possible to apply the automatic power restoring method according to the present invention to any desired optical communication system configured to prevent a high level laser light from being emitted to outside at the occurrence of line fault, by means of the conventional automatic output power shutdown system.

What is claimed is:

1. An automatic power restoring method, in which, in an optical communication system for supplying a pumping light for Raman amplification from an optical receiving station side to an optical transmission path connecting between an optical transmitting station and an optical receiving station, and for transmitting a main signal light sent out from the optical transmitting station to the optical receiving station via the optical transmission path while amplifying the main signal light, a power state at an occurrence of line fault in which the power of a light output from the optical transmitting station or the optical receiving station to the optical transmission path is suppressed to a predetermined level or lower, is restored to a power state at a time of normal operation according to a detection of continuity by dissolution of line fault, comprising:

when a line fault occurs, controlling said pumping light for Raman amplification at the power of said predetermined level or lower to switch to a pilot signal light, to send out the pilot signal light from the optical receiving station to the optical transmission path; and detecting continuity by receiving at the optical transmitting station the pilot signal light sent out to the optical transmission path, to restore the power state at the occurrence of line fault to the power state at the time of normal operation.

2. An automatic power restoring method according to claim 1, wherein a transmission rate of said pilot signal light, which is switched from said pumping light for Raman amplification, is set to be lower than a transmission rate of a signal light indicating supervisory control information, which is transmitted between the optical transmitting station and the optical receiving station at the time of normal operation.

3. An automatic power restoring method according to claim 2, wherein said optical transmitting station determines the receiving of said pilot signal light based on the wavelength and transmission rate of the receiving light.

4. An optical communication system for supplying a pumping light for Raman amplification from an optical receiving station side to an optical transmission path connecting between an optical transmitting station and an optical receiving station, and for transmitting a main signal light sent out from the optical transmitting station to the optical receiving station via the optical transmission path while amplifying the main signal light, comprising:

a pilot signal light transmitting section that controls, when a line fault occurs, said pumping light for Raman amplification at the power of said predetermined level or lower to switch to a pilot signal light, to send out the pilot signal light from the optical receiving station to the optical transmission path; and a pilot signal light receiving section that detects continuity by receiving at the optical transmitting station the pilot signal light sent out from said pilot signal light receiving section to the optical transmission path, to restore the power state at the occurrence of line fault to the power state at a time of normal operation.

5. An optical communication system according to claim 4, wherein said pilot signal light transmitting section sets a transmission rate of said pilot signal light to be lower than a transmission rate of a signal light indicating supervisory control information, which is transmitted between the optical transmitting station and the optical receiving station at the time of normal operation.

6. An optical communication system according to claim 5, wherein said pilot signal light receiving section determines the receiving of said pilot signal light based on the wavelength and transmission rate of the receiving light.

* * * * *